United States Patent [19]

Stevens et al.

[11] Patent Number: 4,585,076
[45] Date of Patent: Apr. 29, 1986

[54] IMPLEMENT AND TRANSPORT WHEEL ASSEMBLY THEREFOR

[75] Inventors: Robert J. Stevens, Saratoga; Clinton E. Bromley, Laramie, both of Wyo.

[73] Assignee: The United States of America as represented by the Secretary of Agriculture, Washington, D.C.

[21] Appl. No.: 573,748

[22] Filed: Jan. 25, 1984

[51] Int. Cl.$^4$ .............................................. A01B 73/00
[52] U.S. Cl. ..................................... 172/240; 172/554
[58] Field of Search ....................... 172/122, 240, 554; 56/228, 385; 280/402; 404/85

[56] References Cited

U.S. PATENT DOCUMENTS

| | | | |
|---|---|---|---|
| 1,801,923 | 4/1931 | Kella | 172/240 |
| 2,055,974 | 9/1936 | Greiner | 404/85 |
| 2,141,805 | 12/1938 | White | 172/240 |
| 2,154,720 | 4/1939 | Biles | 172/240 X |
| 2,771,828 | 11/1956 | Troeng et al. | 172/240 X |
| 3,094,315 | 6/1963 | Yetter | 172/240 X |
| 3,171,498 | 3/1965 | Logan | 172/554 X |

FOREIGN PATENT DOCUMENTS

| | | | |
|---|---|---|---|
| 585384 | 11/1958 | Italy | 172/240 |
| 832314 | 4/1960 | United Kingdom | 172/240 |

Primary Examiner—Richard T. Stouffer
Attorney, Agent, or Firm—M. Howard Silverstein; David G. McConnell

[57] ABSTRACT

An apparatus for transporting an earth working implement, most specifically, a roller-chopper unit for use in forestry, wherein a transporting wheel assembly is disposed upon the earth working implement or its frame thereby providing transportation for the earth working implement from job site to job site. The wheel assembly has a stored position in which the wheels are maintained while the earth implement is performing its task at a specific job site and the transporting wheel assembly further being movable between a working position in which the wheels are maintained against the ground and support the earth working implement during transportation between job sites.

2 Claims, 2 Drawing Figures

IMPLEMENT AND TRANSPORT WHEEL ASSEMBLY THEREFOR

FIELD OF THE INVENTION

This invention relates to an apparatus for transporting earth working implements, and more specifically relates to the transport of an implement over roads.

BACKGROUND OF THE INVENTION

Earth working implements, especially roller-chopper units, more fully described below, pose a number of problems is being transported from place to place. Roller-chopper units are large water filled, drum-like implements with radial, longitudinally disposed blades. The implement is rolled over an area of former timber land that has been clear cut. The rolling action is accomplished by pulling the roller-chopper implement behind a tractor, the blades crushing the logging debris and exposed mineral materials, thereby preparing the area for reforestation. Such an implement must be transported from job site to job site after completion of work at each job site. Because of earth working characteristics of the implement, such an implement may not be rolled directly down a highway since it would perform the same crushing operations to the road surface as it had just accomplished on the forest land. In the past, roller chopper units and other heavy equipment implements utilized for working the earth have been transported between job sites on heavy duty hauling vehicles often called "lowboys" or other special trailers. The availability of lowboy type trailers or other special trailer units is generally a problem for which no economic or practical solution has heretofore existed. Such equipment is not readily available and it is too expensive to have waiting idle at a job site to transport an implement at some time in the future. Also the remoteness of such job sites further increases the time delay. Therefore, it has been necessary to expend great amounts of time to the transportation and preparation for transportation of earth working implements and/or roller chopper units between job sites. There is therefore a need for an inexpensive, readily available method and apparatus for transporting earth working implements between job sites.

DESCRIPTION OF THE PRIOR ART

U.S. Pat. No. 2,718,419 to Simmons discloses a straightening apparatus for weight transferring, steering, and towing hitch which shows an earth mover type piece of equipment being towed by a tractor along a road. The purpose of the invention is to provide straightening of the trailer. However, the pertinence in this particular case lies in the providing of over ground transportation for an earth working implement, the design of the implement itself being more pertinent than the tractor. The earth working implement has a movable drag bucket which may be raised from and lowered to the ground by the action of the transportation mechanism itself, although the wheels do not actually leave the ground during the positioning of the drag bucket.

U.S. Pat. No. 2,789,377 to Armington discloses an earth working apparatus with a carrying dolly for supporting a digging and carrying type of earth worker. As shown in FIG. 1 an additional dolly assembly operates to raise and lower the working bucket. However, the working dolly wheels do not have a stored position in which they are off of the ground.

U.S. Pat. No. 2,964,861 to Corsini also shows an earth working vehicle with an additional set of wheels for the purpose of transferring weight when the scraper bucket is full. Again, the wheels diclosed do not have a stored position which is off of the ground.

U.S. Pat. No. 3,186,496 to Cox et al. discloses a reversible disc plow in which wheels are utilized to adjust the height of the plow during earth working operations. Again, the wheels are not shown to be of the type that can be moved to a stored position free of the ground since the earth working implement with which they are used is not of the type that is capable of bearing its own weight and still controlling the depth of its earth working operations. The use of the wheel is required for the earth working operations rather than being one for transportation only.

U.S. Pat. No. 3,561,538 to Curlett discloses earth working equipment wherein height control is achieved by use of an external elongated reference member disposed along the path to be traveled by the scraper. Again, no transportation wheel assembly is used and the wheels that are already present on the equipment do not exhibit a stored position.

U.S. Pat. No. 4,055,007 to Johnson discloses a box-type earth working apparatus which has the same deficiencies as previously shown.

U.S. Pat. No. 4,253,528, to Sullivan et al, discloses a land wheel assembly including dual wheels pivotably mounted on a vertically positionable arm of the implement, such as a plow. When the arm is lowered and the plow is in the transport position, the wheels can rock in a castering fashion about the pivotable axis while having substantially vertical components such that the implement is turned around a corner. Again, this is for driving an implement over the ground and lowering it into a working position. However, the wheels themselves must remain against the ground and do not have a stored position in which the wheel is fully removed from contact with the ground.

SUMMARY OF THE INVENTION

An apparatus for transporting an earth working implement between job sites and specifically over roads is useful in road construction or forest working sites. While our work is generally related to the transportation between job sites of a roller-chopper unit, the apparatus has equal stability for other earth working implements that would ordinarily require special arrangements for the availability of trailers to haul the implements between job sites.

The present invention provides for the combination of an earth working implement and a transport wheel assembly moveably mounted on said implement having working and stored positions.

DETAILED DESCRIPTION OF THE INVENTION

Figure 1:
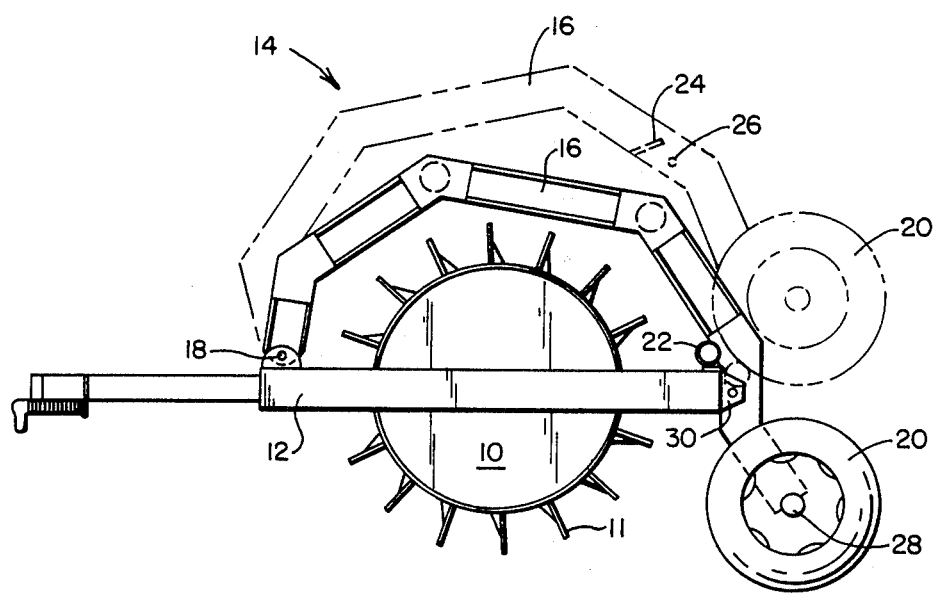
FIG. 1 is a side elevational view of an earth working implement with a transporting wheel assembly shown in apparatus transport position and in phantom in stored position.

FIG. 1 is a side elevational view of an earth working implement, in this case a roller-chopper unit used in forestry, showing the transporting wheel assembly 14 in the working position, while the dashed lines depict the transporting wheel assembly in stored position. Such an apparatus is normally operated in the field in its roller-chopper mode with the transportation assembly in the stored position. The apparatus towed by a tractor or bulldozer (not shown). The roller chopper drum 10 is retained within a frame assembly 12 which is preferably of a rectangular tubular steel construction. The transporting wheel assembly 14 is pivotably retained upon frame 12 at pivot point 18, preferably a pin-type joint about which structural arm assembly 16 pivots on frame 12. Structural arm assembly 16 has two basic positions between which it is moved about pivot point 18. A stored position in which wheels 20 are raised off of the ground and a working position in which structural arm assembly 16 is lowered so that the wheels 20 engage the ground. Structural arm assembly 16 is shown to extend from a point on frame 12 at pivot 18 over the top of roller-chopper drum 10 and engaging structure at the opposite end of frame 12, more fully described below. In this way the structural frame while being moved between the working and stored positions does not interfere with the operation of roller-chopper drum 10 and in relatively simple fashion allows wheels 20 to be stored by frame 12 structures at a point generally above roller-chopper drum 10.

Also shown on the structural support assembly 16 is a support or mating plate 24 which provides the mating surface for maintaining the transporting wheel assembly in its lowered or working position and providing support against the frame 12. A hinged bumper 22 is pivotable between two positions. When in one position shown in phantom, the hinged bumper 22 interferes with the free motion of the wheel 20 past the hinged bumper thereby providing both a support and a stop for the transporting wheel assembly 14 in its stored position. In order to lower the assembly, the transporting wheel assembly 14 must be raised slightly, so that the hinged bumper 22 may be rotated to its second position thereby removing the interference and allowing the transporting wheel assembly to freely pass that point and the wheel 20 to engage the ground.

Also shown on the structural-arm assembly 16 is a hole 26 which receives a locking pin 25 when the transporting wheel assembly 14 is in its lowered or working position. The pin 25 will pass through the gusset plate 30 and through the pin hole 26 in the structural assembly 16. The transporting wheel assembly 14 is in its lowered position when mating plate 24 is flush against gusset flange 30 and pin hole 26 is aligned with the hole in gusset flange 30.

The purpose of the transporting wheel assembly 14 is to provide a wheeled assembly available for raising and maintaining the earth working implement above a road surface so that no damage occurs to the road surface while that implement is being transported from place to place along the public roads. It will be appreciated that other types of earth working implements may be utilized in the position of the roller-chopper drum 10 and that with the variations available for the transporting wheel assembly 14 and the frame 12, a number of inherently operable embodiments of such a wheeled transportation assembly are within the scope of the disclosure. The fundamental requirements are that the wheels be at all times available for use in transporting the implement from point to point, the framing strong enough to support the weight of the implement and to properly maintain the orientation of the transportation assembly in its working positions and the wheels be stored on the implement while the implement is performing its earth working tasks so that they need not be separately stored in the field.

When a roller chopper machine that has been provided with a transport wheel assembly according to the present invention has completed its work, it is necessary to move the transport wheel assembly from the stored position in which the wheels are raised off the ground to the working position in which the wheels engage the ground. This is accomplished by first taking the weight off of the transport wheel assembly in order that the hinged bumper 22 can be pivoted to its appropriate position to allow the transport wheel assembly to pass. The method currently being employed is to utilize the tractor which pulls the roller-chopper machine in the field to lift the wheel assembly away from engagement with hinged bumper 22. It has been found that by securing a cable to the movable track of the tractor and securing the other end of that cable to the structural arm assembly 16 followed by the tractor pulling the roller-chopper machine forward a few feet, the movement of the track on the tractor acts to apply tension to the cable thereby lifting structural arm assembly 16 to take the weight off of hinged bumper 22. Once the weight of the transport wheel assembly has been removed from hinged bumper 22, it can be pivoted to a position that will allow the transport wheel assembly to pass. The tension in the cable is then released by backing the roller-chopper assembly and bulldozer thereby allowing the wheels to pass the hinged bumper area and engage the ground. Both the wheels and the roller-chopper assembly are now engaging the ground. The roller-chopper assembly is then rolled onto a small mound of dirt sufficiently high that the wheel assembly may be lowered to the point that mating plate 24 comes into contact with gusset flange 30 sufficient that pin holes 26 in gusset flange 30 are properly aligned. The pins 25 can then be inserted into pin holes 26 so that the roller-chopper drum will be free from the ground once the entire assembly has been rolled off of the mountdof dirt, the weight then being borne by the pins 25. It will be appreciated that there are additional methods which could be utilized in moving the transport wheel assembly to the working position as for example the use of hydraulics to force the roller-chopper drum in an upward position relative to the transport wheels so that the pins can be engaged without the use of a mound of dirt. To move the transport wheel assembly from the working position to the stored position, the process is reversed. Alternatively, the roller-chopper unit and transport wheel assembly can be lifted by a winch mounted, as for example, on the tractor.

Figure 2:
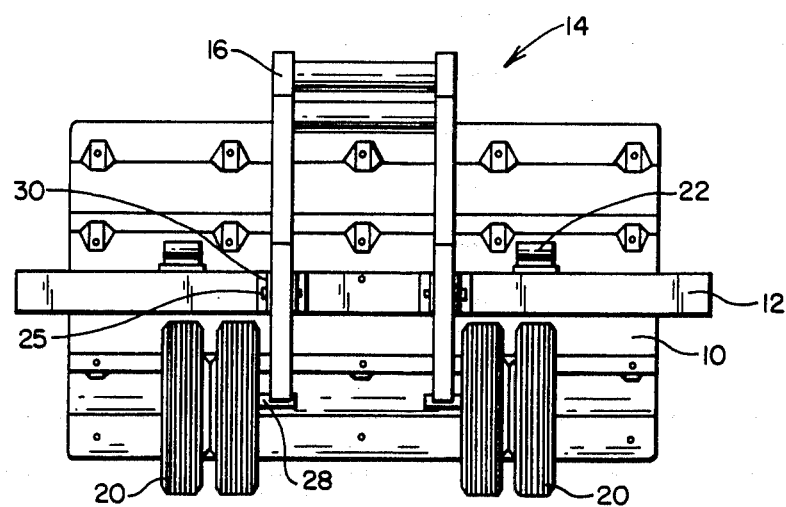
FIG. 2 is a front elevational view of the earth working implement of FIG. 1 with the transport wheel assembly in the working position.

Turning now to FIG. 2, which is a front elevational view of the apparatus of FIG. 1, the holes 26 in transporting wheel assembly 14 are shown aligned with similar holes in gusset plate 30, a pin 25 passing therethrough. The pin 25 acts to lock the transportation wheel assembly 14 in its working position, and must be removed to move the transport wheel assembly 14 from the working position to the stored position. In this view, an additional feature of the transporting wheel assembly may be visualized, that being the location of the wheels relative to the frame and the roller-chopper unit that is being transported. The transporting wheel assembly 14 is centrally located in the front elevational view and the wheels are spaced such that the earth working implement, the roller-chopper unit, overhangs the wheel base of the transporting wheel assembly on both sides. This gives the assembly with roller-chopper unit good tracking ability on roads designed for trucks.

This invention may be embodied in other specific forms without departing from the spirit or essential characteristics thereof. The present embodiments are therefore considered in all respects as illustrative and not restrictive, the scope of the invention being indicated by the appended claims rather than the foregoing description of the drawings, and all changes coming within the meaning and range of equivalency of the claims are therefore intended to be embraced therein.

We claim:

1. In the combination of an earth working implement and a transport wheel assembly for maintaining the implement above a level surface for purposes of transporting the implement to a different work site the combination comprising, an earth working implement mounted on a frame, said frame including a front, two side and a rear portions, the front portion including means to attach the frame to a device for pulling the implement, the implement being supported by means extending from the two side portions, a bumper pivotally mounted on the rear portion of the frame, a wheel assembly including at least two spaced apart wheels mounted on an arm pivoted from the front portion of the frame, said arm being configured to be out of contact with said implement at all times, the bumper being aligned with the arc of rotation of the surface of at least one of said wheels as said one wheel is moved by the arm as it pivots from the front portion of the frame, said bumper in one position engaging the surface of one wheel to prevent its downward movement toward said level surface, said rear portion of the frame including means for locking the arm against rotation with the wheels at a lower elevation than the implement to thereby allow the implement to be moved over the level surface without contacting it.

2. The combination of claim 1 wherein said locking means comprises a pin projecting through aligned apertures in said arm and a bracket on said rear portion of the frame.

* * * * *